(12) United States Patent
Pokam et al.

(10) Patent No.: US 9,875,108 B2
(45) Date of Patent: Jan. 23, 2018

(54) SHARED MEMORY INTERLEAVINGS FOR INSTRUCTION ATOMICITY VIOLATIONS

(71) Applicant: Intel Corporation, Santa Clara, CA (US)

(72) Inventors: Gilles A. Pokam, Fremont, CA (US); Rolf Kassa, Braunschweig (DE); Klaus Danne, Braunschweig (DE); Tim Kranich, Braunschweig (DE); Cristiano L. Pereira, Sunnyvale, CA (US); Justin E. Gottschlich, Santa Clara, CA (US); Shiliang Hu, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 13/844,817

(22) Filed: Mar. 16, 2013

(65) Prior Publication Data

US 2014/0281274 A1    Sep. 18, 2014

(51) Int. Cl.

| G06F 12/08 | (2016.01) |
|---|---|
| G06F 9/38 | (2006.01) |
| G06F 9/32 | (2006.01) |
| G06F 12/0811 | (2016.01) |
| G06F 12/0842 | (2016.01) |

(52) U.S. Cl.
CPC ............ *G06F 9/3834* (2013.01); *G06F 9/321* (2013.01); *G06F 12/0811* (2013.01); *G06F 12/0842* (2013.01); *Y02B 60/1225* (2013.01)

(58) Field of Classification Search
CPC ............ G06F 12/0831; G06F 12/0607; G06F 12/0851; G06F 12/0811; G06F 12/0806; G06F 12/0828; G06F 12/08; G06F 2212/62; G06F 2212/621; G06F 13/1647; G06F 13/1652; G06F 13/4243; G06F 9/3859; G06F 9/3857; G06F 9/3834; G06F 9/4243; G06F 9/3824; G06F 9/32; G06F 9/321; G11C 7/22
USPC ..... 711/143–145, 154, 156–157, 127, 5, 14; 712/203, 216
See application file for complete search history.

(56) References Cited

U.S. PATENT DOCUMENTS 5,740,461 A * 4/1998 Jaggar ................. G06F 9/30174
712/209
5,996,064 A * 11/1999 Zaidi ..................... G06F 9/3836
712/214

(Continued)

OTHER PUBLICATIONS

Hower, D.R. and M.D. Hill, "Rerun: Exploiting Episodes for Lightweight Memory Race Recording," In Proceedings of International Symposium on Computer Architecture, 2008.*

(Continued)

*Primary Examiner* — Ann J Lo
*Assistant Examiner* — Tracy A Warren
(74) *Attorney, Agent, or Firm* — Trop, Pruner & Hu, P.C.

(57) ABSTRACT

A system, processor, and method to record the interleavings of shared memory accesses in the presence of complex multi-operation instructions. An extension to instruction atomicity (IA) is disclosed that makes it possible for software to infer partial information about a multi-operation execution if the hardware has recorded a dependency due to an instruction atomicity violation (IAV). By monitoring the progress of a multi-operation instruction, the need for complex multi-operation emulation is unnecessary.

24 Claims, 9 Drawing Sheets

(56) References Cited

U.S. PATENT DOCUMENTS

| | | |
|---|---|---|
| 7,188,290 B2 | 3/2007 | Kassa |
| 7,376,798 B1* | 5/2008 | Rozas .................. G06F 9/3824 710/22 |
| 8,806,270 B2* | 8/2014 | Adir et al. ..................... 714/11 |
| 2007/0143276 A1 | 6/2007 | Harris |
| 2007/0283102 A1 | 12/2007 | Corrigan et al. |
| 2007/0294702 A1 | 12/2007 | Melvin et al. |
| 2008/0062786 A1 | 3/2008 | Kim et al. |
| 2008/0098184 A1 | 4/2008 | Huras et al. |
| 2008/0109641 A1 | 5/2008 | Ball et al. |
| 2008/0163220 A1* | 7/2008 | Wang et al. .................. 718/101 |
| 2009/0043845 A1 | 2/2009 | Garza et al. |
| 2009/0046851 A1 | 2/2009 | Elmegaard-Fessel |
| 2009/0077540 A1 | 3/2009 | Zhou et al. |
| 2009/0172305 A1 | 7/2009 | Shpeisman et al. |
| 2009/0172317 A1* | 7/2009 | Saha et al. .................... 711/159 |
| 2009/0319739 A1 | 12/2009 | Shpeisman et al. |
| 2010/0005255 A1 | 1/2010 | Kaushik et al. |
| 2010/0162250 A1 | 6/2010 | Adl-Tabatabai et al. |
| 2010/0325376 A1 | 12/2010 | Ash et al. |
| 2011/0010712 A1 | 1/2011 | Thober et al. |
| 2011/0022893 A1 | 1/2011 | Yang et al. |
| 2011/0172968 A1* | 7/2011 | Davis .................. G06F 9/30145 702/186 |
| 2011/0271017 A1 | 11/2011 | Shpeisman et al. |
| 2012/0174083 A1 | 7/2012 | Shpeisman et al. |
| 2013/0047163 A1 | 2/2013 | Marathe et al. |
| 2013/0219367 A9 | 8/2013 | Zhou et al. |

OTHER PUBLICATIONS

Pokam, G., Pereira, C., Danne, K., Kassa, R., and A. Adi-Tabatabai, "Architecting a Chunk-based Memory Race Recorder in Modern CMPs," Micro, 2009.*

Pokam, G., Pereira, C., Shiliang, H., Adi-Tabatabai, A., Gottschlich, J., Ha, J., and Y. Wu, "CoreRacer: A Practical Memory Race Recorder for Multicore x86 TSO Processors," Micro, 2011.*

\* cited by examiner

US 9,875,108 B2

SHARED MEMORY INTERLEAVINGS FOR INSTRUCTION ATOMICITY VIOLATIONS

TECHNICAL FIELD

Embodiments described herein pertain to microprocessor-based systems and, more particularly, maintaining cache coherency in multicore processors.

BACKGROUND

Computer programs may execute in a non-deterministic manner on a multicore processor. Multiprocessor trace tools may attempt to record the access order of shared memory load and store operations executed by the various cores. To the extent that multiprocessor trace tools assume instruction atomicity, a 1:1 correspondence between program instructions and core-level operations, sometimes referred to herein as atomic operations, atomic ops, atoms, or operations, the presence of complex program instructions, in which a single program instruction decodes into two or more atomic operations, presents a challenge.

DESCRIPTION OF EMBODIMENTS

Figure 1:
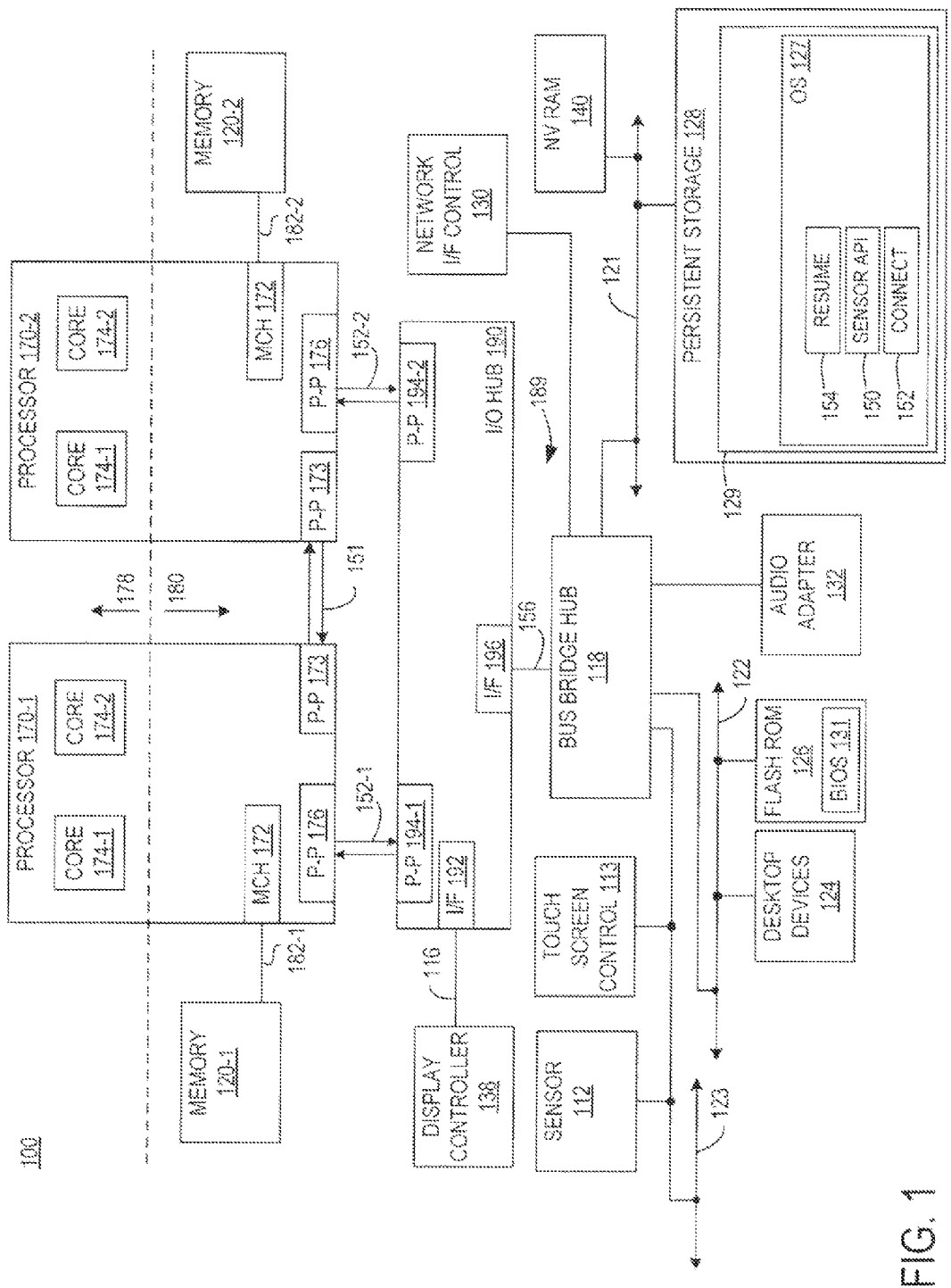
FIG. 1 illustrates a system used in conjunction with at least one embodiment.

Embodiments pertain to the recording of shared memory accesses in the presence of multi-operation, non-atomic, or complex instructions. At least one embodiment includes logic to detect and record instruction atomicity violation (IAV) information. In at least one embodiment, IAV information makes it possible for software to infer information about execution of the multiple atomic operations associated with a complex instruction. In the absence of IAV information, a software tool may be unable to reproduce an ordering between two instructions that perform more than one memory access if a dependency between them happens in the middle of their executions.

In at least one embodiment, an instruction tracing method includes incrementing a counter value by a first predetermined constant responsive to detecting a first type of atomic operation (atomic op) event, incrementing the counter value by a second predetermined constant responsive to detecting completion of a second type of atomic op event, and resetting the counter value responsive to a complex instruction completing. The method may include recording a value of an atomicity counter in conjunction with a trace of the complex instruction responsive to a coherency event associated with a memory access by a first thread occurring during a pendency of the complex instruction.

In some embodiments, the first type of atomic op event is a memory access atomic op, and the first type of atomic op event is a retirement of an atomic op memory access. In some embodiments, the first predetermined constant is indicative of a latency of a memory access. The first predetermined constant represents two core clock cycles in at least one embodiment. In at least one embodiment, the second type of atomic op event is a split load/store comprising a load that spans a cache line boundary and requires a plurality of accesses and the second type of atomic op event comprises a retirement of an atomic op memory access.

In at least one embodiment, the method may include determining an interleaving for an execution trace that includes a complex instruction executed on a second thread, and a simple instruction on the first thread, wherein the interleaving includes a first instruction group and a second instruction group corresponding to the complex instruction. In some embodiments, the first instruction group includes atomic operations that complete before the execution of the simple instruction on the second thread and the second instruction group includes atomic operations that complete after execution of the simple instruction on the second thread. In some embodiments, non-zero values of the atomicity counter associated with the first instruction group.

In at least one embodiment, a processor includes a first core to execute a first thread including a complex instruction. The complex instruction may execute as a plurality of atomic operations (atomic ops). A second core to execute a second thread including a simple instruction. The processor further includes, in at least one embodiment, an atomicity counter to increment a counter value by a first predetermined constant responsive to detecting a first type of atomic op event, increment the counter value by a second predetermined constant responsive to detecting completion of a second type of atomic op event, and reset the counter value responsive to the complex instruction completing. The atomicity counter records or logs a value of the atomicity counter in conjunction with a trace or record of the complex instruction in response to a coherency event associated with a memory access by another core or another second thread occurring during a pendency of the complex instruction.

In one embodiment, a computer system includes a processor, system memory, and one or more I/O devices. The processor includes a first core to execute a first thread including a complex instruction and a second core to execute a second thread including a simple instruction. The processor includes an atomicity counter to increment a counter value by a first predetermined constant responsive to detecting a first type of atomic op event, increment the counter value by a second predetermined constant responsive to detecting completion of a second type of atomic op event, reset the counter value responsive to the complex instruction completing; and record a value of the atomicity counter in conjunction with a record of the complex instruction responsive to a coherency event associated with a memory access by the second thread occurring before the complex instruction completes.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Embodiments may be implemented in many different system types and platforms. FIG. 1 illustrates a system used in conjunction with at least one embodiment. In at least one embodiment, system 100 is a multi-processor system that includes a first processor 170-1 and a second processor 170-2. Although some embodiments include two processors 170, other embodiments may include more or fewer processors. In at least one embodiment, each processor 170 includes a core region 178 and an uncore region 180. In some embodiments, core region 178 includes one or more processing cores 174, while uncore region 180 includes a memory controller hub (MCH) 172, a processor-hub point-to-point interface 176, and a processor-processor point-to-point interface 173.

In at least one embodiment, MCH 172 supports bidirectional transfer of data between a processor 170 and a system memory 120 via a memory interconnect 182. In some embodiments, system memory 120 may be a double-data rate (DDR) type dynamic random-access memory (DRAM) while memory interconnect 182 and MCH 172 may comply with a DDR interface specification. In some embodiments, system memory 120-1 may include a bank of memory interfaces populated with corresponding memory devices or boards.

In some embodiments, system 100 is a distributed memory embodiment in which each processor 170 communicates with a local portion of system memory 120. In at least one embodiment, system memory 120-1 is local to processor 170-1 and represents a portion of the system memory 120 as a whole, which is a shared memory space. In these embodiments, each processor 170 can access each portion of system memory 120, whether local or not. In some embodiments, while local accesses may have lower latency, accesses to non-local portions of system memory 120 are permitted.

In some embodiments, each processor 170 also includes a point-to-point interface 173 that supports communication of information with a point-to-point interface 173 of one of the other processors 170 via an inter-processor point-to-point interconnection 151. In some embodiments, processor-hub point-to-point interconnections 152 and processor-processor point-to-point interconnections 151 are distinct instances of a common set of interconnections. In other embodiments, point-to-point interconnections 152 may differ from point-to-point interconnections 151.

In at least one embodiment, processors 170 include point-to-point interfaces 176 to communicate via point-to-point interconnections 152 with a point-to-point interface 194 of an I/O hub 190. In some embodiments, I/O hub 190 includes a graphics interface 192 to support bidirectional communication of data with a display controller 138 via a graphics interconnection 116, which may be implemented as a high speed serial bus, e.g., a peripheral components interface express (PCIe) bus, or another suitable bus.

In some embodiments, I/O hub 190 also communicates, via an interface 196 and a corresponding interconnection 156, with a bus bridge hub 118 that supports various bus protocols for different types of I/O devices or peripheral devices. In at least one embodiment, bus bridge hub 118 supports a network interface controller (NIC) 130 that implements a packet-switched network communication protocol (e.g., Gigabit Ethernet), a sound card or audio adapter 132, and a low bandwidth bus 122 (e.g., low pin count (LPC), I2C, Industry Standard Architecture (ISA)), to support legacy interfaces referred to herein as desktop devices 124 that might include interfaces for a keyboard, mouse, serial port, parallel port, and/or a removable media drive. In some embodiments, low bandwidth bus 122 further includes an interface for a nonvolatile memory (NVM) device such as flash read only memory (ROM) 126 that includes a basic I/O system (BIOS) 131. In at least one embodiment, system 100 also includes a peripheral bus 123 (e.g., USB, PCI, PCIe) to support various peripheral devices including, but not limited to, one or more sensors 112 and a touch screen controller 113.

In at least one embodiment, bus bridge hub 118 includes an interface to a storage protocol bus 121 (e.g., serial AT attachment (SATA), small computer system interface (SCSI)), to support persistent storage 128, including but not limited to magnetic core hard disk drives (HDD), and a solid state drive (SSD). In some embodiments, persistent storage 128 includes code 129 including processor-executable instructions that processor 170 may execute to perform various operations. In some embodiments, code 129 may include, but is not limited to, operating system (OS) code 127 and application program code. In at least one embodiment, system 100 also includes nonvolatile (NV) RAM 140, including but not limited to an SSD and a phase change RAM (PRAM).

Although specific instances of communication busses and transport protocols have been illustrated and described, other embodiments may employ different communication busses and different target devices. Similarly, although FIG. 1 illustrates an embodiment of system 100 that includes one or more processors 170 and a chipset 189 that includes an I/O hub 190 with an integrated graphics interface, and a bus bridge hub supporting other I/O interfaces, in other embodiments, system 100 may include embodiments in which MCH 172 is integrated in I/O hub 190 and embodiments in which graphics interface 192 is integrated in processor 170. In embodiments that include integrated MCH 172 and graphics interface 192 in processor 170, I/O hub 190 and bus bridge hub 118 may be integrated into a single-piece chipset 189.

In at least one embodiment, persistent storage 128 includes code 129 executable by processor 170 to perform operations. In some embodiments, code 129 includes code for an OS 127. In some embodiments, OS 127 includes a core performance scalability algorithm 142 and an uncore performance scalability algorithm 144 to determine or estimate a performance scalability of processor 170. In at least one embodiment, OS 127 also includes core power scalability algorithm 146 and uncore power scalability algorithm 148 to determine or estimate a power scalability of processor 170.

In some embodiments, OS 127 also includes a sensor API 150, which provides application program access to one or more sensors 112. In at least one embodiment, sensors 112 include, but are not limited to, an accelerometer, a global positioning system (GPS) device, a gyrometer, an inclinometer, and an ambient light sensor. In some embodiments, OS 127 also includes a resume module 154 to reduce latency when transitioning system 100 from a power conservation state to an operating state. In at least one embodiment, resume module 154 may work in conjunction with NV RAM 140 to reduce the amount of storage required when system 100 enters a power conservation mode. Resume module 154 may, in one embodiment, flush standby and temporary memory pages before transitioning to a sleep mode. In some embodiments, by reducing the amount of system memory space that system 100 is required to preserve upon entering a low power state, resume module 154 beneficially reduces the amount of time required to perform the transition from the low power state to an operating state.

In at least one embodiment, OS 127 also includes a connect module 152 to perform complementary functions for conserving power while reducing the amount of latency or delay associated with traditional "wake up" sequences. Connect module 152 may, in some embodiments, periodically update certain "dynamic" applications including email and social network applications, so that, when system 100 wakes from a low power mode, the applications that are often most likely to require refreshing are up to date.

Figure 2A:
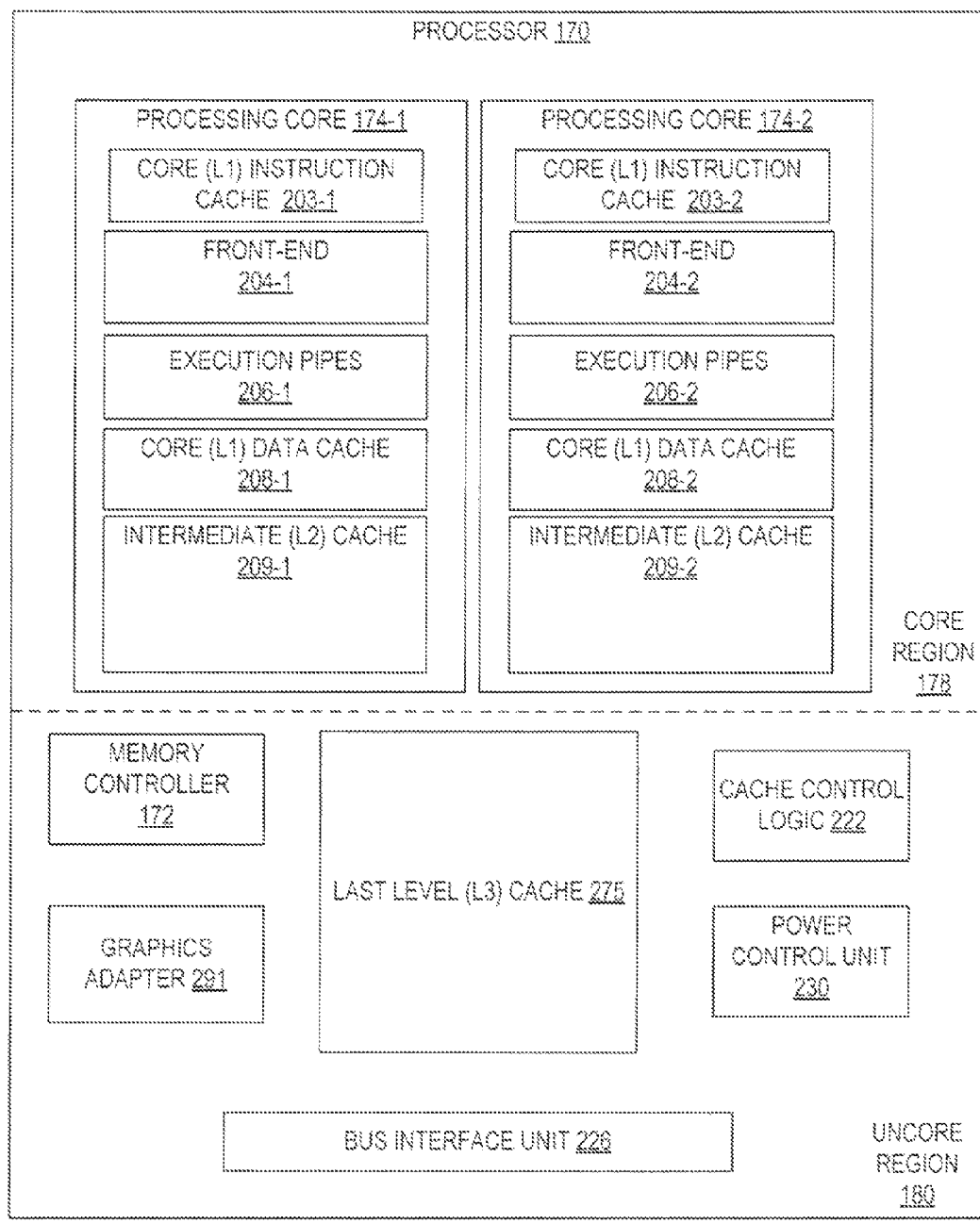
FIG. 2A illustrates a processor used in conjunction with at least one embodiment.

FIG. 2A illustrates a processor used in conjunction with at least one embodiment. In at least one embodiment, processor 170 includes a core region 178 and an uncore region 180. In at least one embodiment, core region 178 includes processing cores 174-1 and 174-2. In other embodiments, processor 170 may include more or fewer processing cores 174.

In at least one embodiment, each processing core 174 includes a core or level 1 (L1) instruction cache 203, a front-end 204, execution pipes 206, a core or L1 data cache 208, and an intermediate or level 2 (L2) cache 209. In some embodiments, front-end 204 receives or generates program flow information including an instruction pointer and branch predictions, fetches or prefetches instructions from core instruction cache 203 based on the program flow information it receives, and issues instructions to execution pipes 206. In some embodiments, front-end 204 may also perform instruction decoding to identify operation codes, identify source and destination registers, and identify any memory references. In some embodiments, execution pipes 206 may include multiple parallel execution pipelines including one or more floating point pipelines, one or more integer arithmetic logic unit pipelines, one or more branch pipelines, and one or more memory access pipelines, also referred to herein as load/store pipelines. In some embodiments, execution pipes 206 may generate micro code to process the instructions from core instruction cache 203, route instructions through the appropriate execution pipeline, and store any results in destination registers. In at least one embodiment, execution pipes 206 may encompass a register file that may support features including register renaming, speculative execution, and out-of-order execution of instructions.

In some embodiments, uncore region 180 includes a last level (L3) cache (LLC) 275 and cache control logic 222. In this embodiment, LLC 275 is a shared resource for all of processing cores 174 of processor 170. In some embodiments, as suggested by its name, LLC 275 represents, from the perspective of processor 170, the last available hierarchical tier of cache memory. In some embodiments, if a memory access instruction that is presented to LLC 275 generates a cache miss, the requested data must be retrieved from system memory 120.

In at least one embodiment, processing core 174 and/or uncore region 180 may include one or more levels of a cache hierarchy between core caches 203, 208, intermediate cache 209, and LLC 275. Each of the cache memories of processing core 174 may, in some embodiments, have a unique architectural configuration. In at least one embodiment, core data cache 208, intermediate cache 209 and LLC 275 are multiple-way, set associative caches. In some embodiments, LLC 275 is inclusive with respect to intermediate cache 209 while, in other embodiments, LLC 275 may be exclusive or non-inclusive with respect to intermediate cache 209. Similarly, in some embodiments, intermediate cache 209 may be either inclusive or non-inclusive with respect to core data cache 208, core instruction cache 203, or both.

In some embodiments, cache control logic 222 controls access to the cache memories, enforces a coherency policy, implements a replacement policy, and monitors memory access requests from external agents, including but not limited to, other processors 170 or I/O devices. In at least one embodiment, LLC 275, intermediate cache 209, and core caches 203, 208 comply with the MESI protocol or a modified MESI protocol. The four states of the MESI protocol are described in Table 1.

TABLE 1

Description of Cacheline States in the MESI Protocol

| MESI State | Description |
| --- | --- |
| Modified | The cache line contains valid data that is modified from the system memory copy of the data. Also referred to as a 'dirty' line. |
| Exclusive | The line contains valid data that is the same as the system memory copy of the data. Also indicates that no other cache has a line allocated to this same system memory address. Also referred to as a 'clean' line. |
| Shared | The line contains valid and clean data, but one or more other caches have a line allocated to this same system memory address. |
| Invalid | The line is not currently allocated and is available for storing a new entry. |

In some embodiments, the cache memories of processor 170 may implement a modified MESI protocol, which might include, in one embodiment, an "F" state identifying one of a plurality of "S" state lines, where the "F" state line is designated as the line to forward the applicable data should an additional request for the data be received from a processor that does not have the data.

In at least one embodiment, uncore region 180 of processor 170 also includes power control unit 230 to control power provided to the various resources of processor 170. In some embodiments, power control unit 230 provides unique power supply levels to core region 178 and uncore region 180. In other embodiments, power control unit 230 may be further operable to provide unique power supply levels to each processing core 174 and/or provide clock signals at unique frequencies to processing cores 174. In addition, in some embodiments, power management unit 230 may implement various power states for processor 170 and define or respond to events that produce power state transitions.

In at least one embodiment, uncore region 180 includes graphics adapter 291 to support low latency, high bandwidth communication with a display device (not depicted). The integration of graphics adapter 291 into processor 170 in some embodiments represents an alternative to embodiments in which graphics interface 192 is implemented in the I/O hub 190.

In some embodiments, uncore region 180 includes a bus interface unit 226 to support communication with one or more chipset devices, discreet bus interfaces, and/or individual I/O devices. In some embodiments, bus interface unit 226 provides one or more point-to-point interfaces such as the interfaces 176 and 173 illustrated in FIG. 1. In other embodiments, bus interface unit 226 may provide an interface to a shared bus to which one or more other processors 170 may also connect.

Figure 2B:
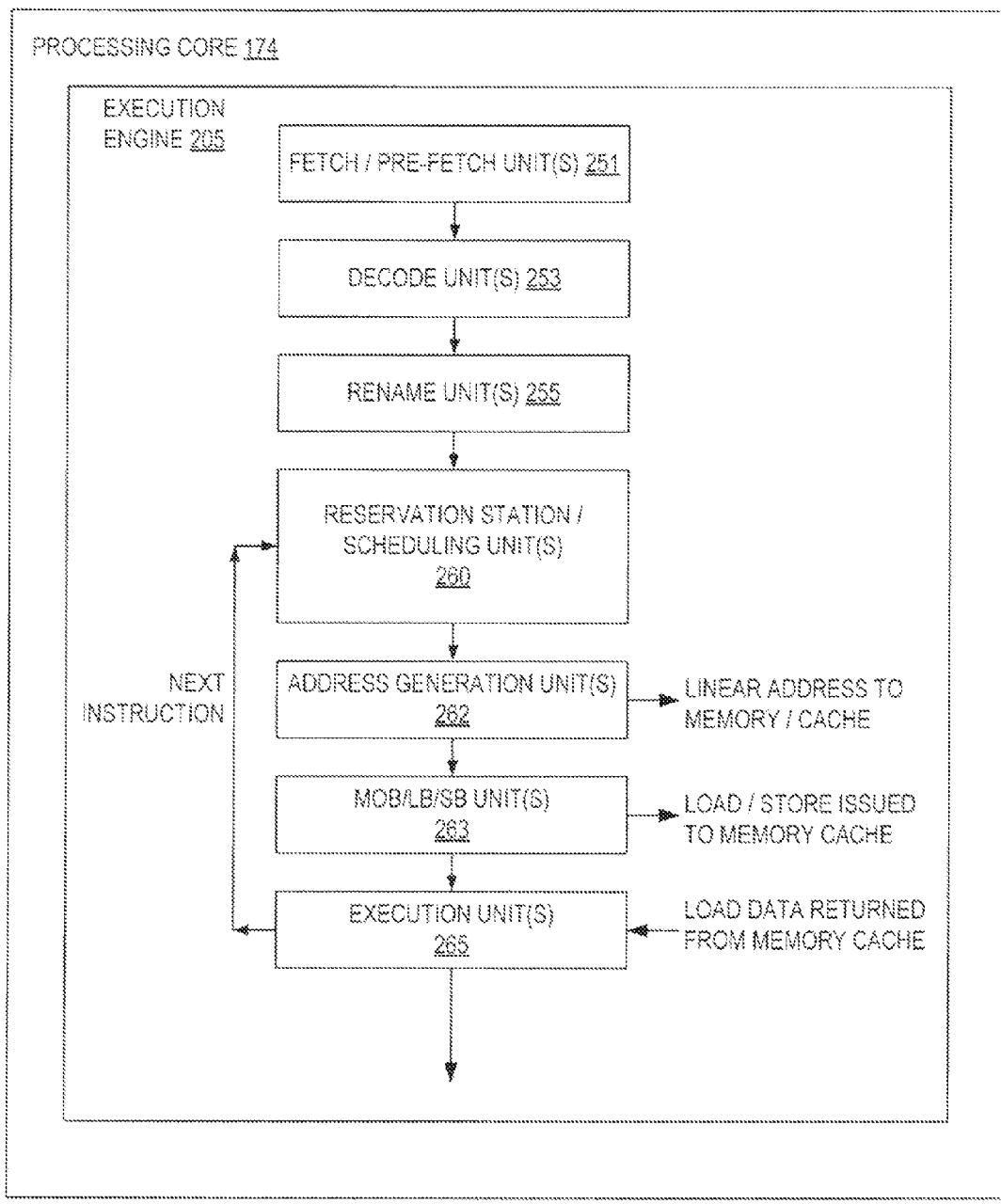
FIG. 2B illustrates a processor used in conjunction with at least one embodiment.

FIG. 2B illustrates an out-of-order execution core. In one embodiment, execution core 205 includes all or some of the elements of front end 204 and execution engine 206 of processing core 274. In at least one embodiment, pending loads may be speculatively issued to a memory address before other older pending store operations according to a prediction algorithm, such as a hashing function. In at least one embodiment, execution core 205 includes a fetch/prefetch unit 251, a decoder unit 253, one or more rename units 255 to assign registers to appropriate instructions or micro-ops, and one or more scheduling/reservation station units 260 to store micro-ops corresponding to load and store operations (e.g., STA micro-ops) until their corresponding target addresses source operands are determined. In some embodiments an address generation unit 262 to generate the target linear addresses corresponding to the load and stores, and an execution unit 265 to generate a pointer to the next operation to be dispatched from the scheduler/reservation stations 260 based on load data returned by dispatching load operations to memory/cache are also included. In at least one embodiment, a memory order buffer (MOB) 263, which may contain load and store buffers to store loads and stores in program order and to check for dependencies/conflicts between the loads and stores is included. In one embodiment, loads may be issued to memory/cache before older stores are issued to memory/cache without waiting to determine whether the loads are dependent upon or otherwise conflict with older pending stores. In other embodiments, processor 270 is an in-order processor.

Figure 3:
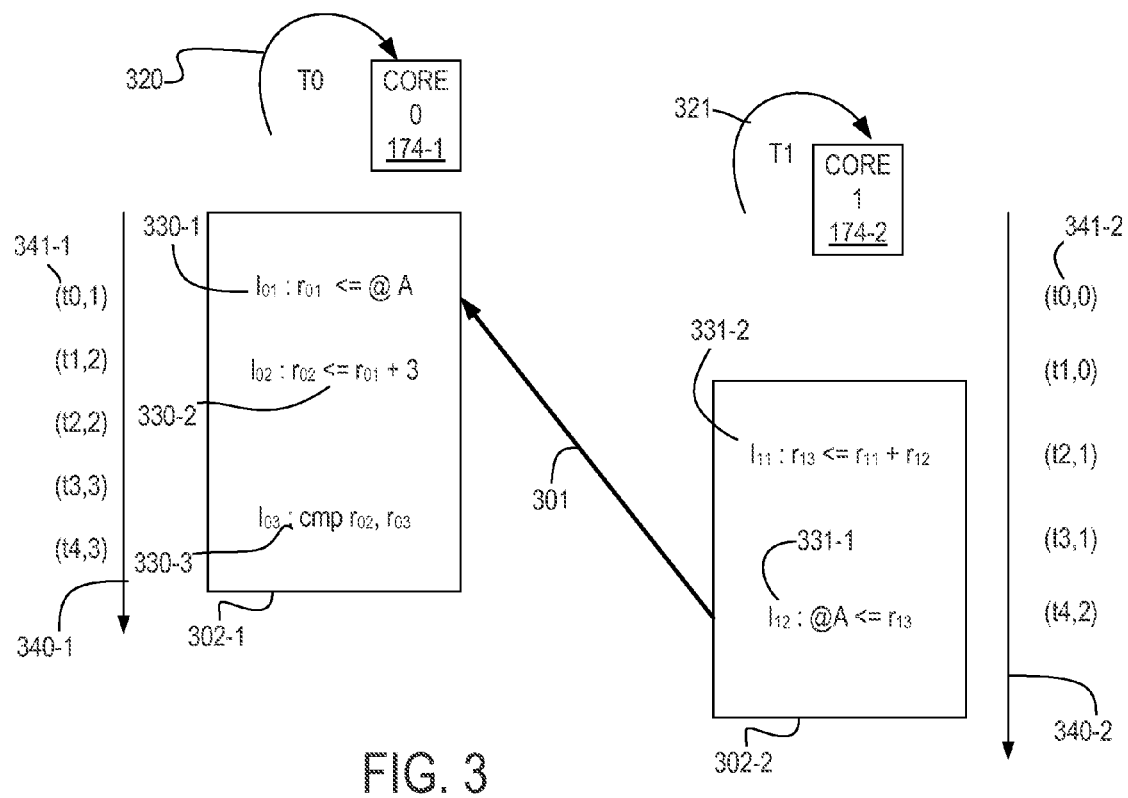
FIG. 3 illustrates a coherence message between threads sharing memory according to one embodiment.

Referring now to FIG. 3, a multicore execution trace 300 generated in conjunction with at least one embodiment is illustrated. In one embodiment, trace 300 includes instructions 330 from a first thread (T0) 320 executed by first processing core (C0) 174-1 and instructions 331 of a second thread (T1) 321 executed by a second core (C1) 174-2. In some embodiments, trace 300 includes executed instructions 330 of first core (C0) 174-1 relative to timeline 340-1 and executed instructions 331 of second core (C1) 174-2 relative to timeline 340-2. In other embodiments, trace 300 may include more or fewer instructions of more or different processing cores 174 over more or fewer clock cycles. In some embodiments, timeline markings 341 are of the form (tX,Y) to indicate the time X as well as the total or cumulative number of executed instructions Y. In this notation, the time tX may, in some embodiments, indicate time in terms of a particular clock cycle. To illustrate, the marking (t1,2) on first timeline 340-1 indicates that first core (C0) 174-1 had executed two instructions, $I_{01}$ 330-1 and $I_{02}$ 330-2, of first thread (T0) 320 at time 1, clock cycle t0 and clock cycle t1, represented by the timeline marking (t1,2) 341-1.

FIG. 3 illustrates an execution trace 300 in which first core (C0) 174-1 executes a first instruction $I_{01}$ 330-1 of first thread (T0) 320 in clock cycle t0, loading the data stored in the memory address A (@A) into register $r_{01}$. First core (C0) 174-1 then executes, in clock cycle t1, a second instruction $I_{02}$ 330-2 of first thread (T0) 320 by adding 3 to the value stored in register $r_{01}$ and storing the resulting sum to register $r_{02}$. The first core (C0) 174-1 executes third instruction $I_{03}$, in which the value of register $r_{03}$ is compared with the value of register $r_{02}$.

Contemporaneously with the execution of first thread (T0) 320 by first core (C0) 174-1, second core (C1) 174-2 executes second thread (T1) 321. The timelines 340-1 and 340-2 are synchronized, meaning that clock cycle t0 on timeline 341-1 and clock cycle t0 on timeline 341-2 refers to the same interval of chronological time. In other embodiments, the timelines of different cores may have different frequencies, phases, or both.

In some embodiments, execution trace 300 includes second core (C1) 174-2 executing a first instruction $I_{11}$ 331-1 of second thread (T1) 321 in clock cycle t2 by adding the value stored in register $r_{11}$ and the value stored in register $r_{12}$ and storing the resulting sum in register $r_{13}$. Execution trace 300 further illustrates second core (C1) 174-2 executing, in clock cycle t4, a second instruction $I_{12}$ 331-2 of first thread (T0) 320, which stores the value in register $r_{13}$ into memory address @A.

In at least one embodiment, the reference to memory address @A in instruction $I_{12}$ executed by second core (C1) 174-2 because $I_{12}$ writes, stores, or otherwise modifies a memory address (@A) that a different core 174 accessed in previously. FIG. 3 illustrates this Write-after-Read (WaR) access pattern producing a WAR coherency event represented by coherency banner 301. In at least one embodiment, a WaR coherency event indicates to one or more processing cores that loaded information from memory address @A to invalidate their respective cache memory copies of the corresponding cache line because a different core has modified the data. In other embodiments, a WaR coherency event may be handled differently. A WaR event might, in some embodiments, result in the core that modified memory address @A writing the data back to memory and forwarding a copy of the modified data to one or more other cores. Thus, the coherency banner 301. 3 does not necessarily correspond to an actual coherency message that was sent from one core to one or more other cores, but is intended to document an access pattern that has implications for an ordering of the two or more threads involved. In at least one embodiment, a multicore trace tool derives a multi-threaded access pattern based at least in part on coherency messages of the type represented by coherency banner 301.

Figure 4:
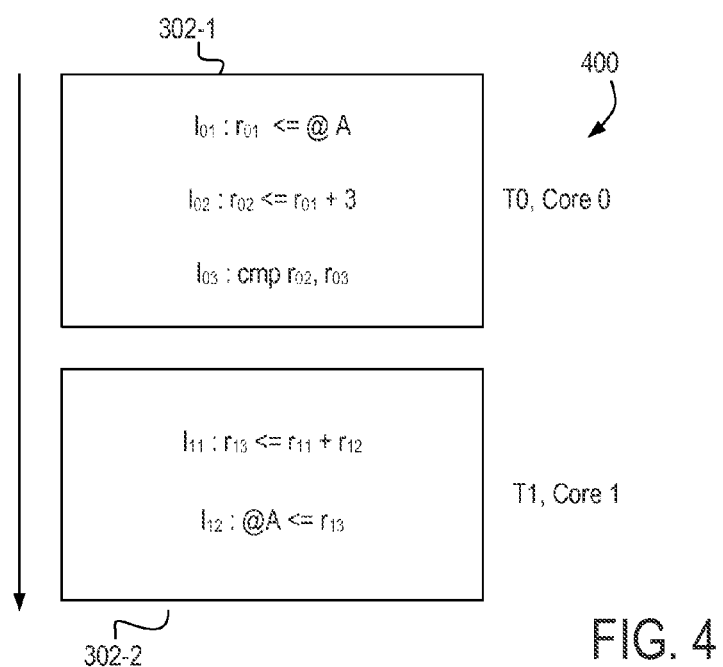
FIG. 4 illustrates a thread interleaving resulting from a coherence message according to one embodiment.

Referring now to FIG. 4, a thread interleaving 400 resulting from the execution pattern represented by trace 300 is illustrated. In at least one embodiment, an interleaving refers to two or more concatenated instruction groups, each of which includes a sequence of one or more instructions executed by one of the processing cores. In at least one embodiment, an instruction group refers to a group of one or more sequentially executed instructions during which no coherency events arise.

In at least one embodiment, interleaving 400 results from coherency banner 301. In some embodiments, in terms of the interleaving 400, coherency banner 301 identifies the applicable instructions groups 401-1 and 401-2 and indicates an order of the instruction groups that should not produce a coherence violation.

In some embodiments, coherency banner 301 identifies a first instructions group 302-1 and a second instruction group 301-2. In at least one embodiment, instruction groups are defined or determined in the clock cycle when a coherency banner is generated. In other embodiments, instructions groups may be defined by different events and conditions. The instruction groups 302-1 and 302-2 are, in some embodiments, defined at the time when the coherency banner 301 is identified and extends to all same-core, same-thread instructions that were not previously assigned to a different instruction group. In some embodiments, with respect to the access pattern illustrated in FIG. 3, instruction groups 302-1 and 302-2 are defined in clock cycle t4, when coherency banner 301 documents the WaR event. Because the WaR event occurred in clock cycle t4, instruction groups 302-1 may, in some embodiments, be defined with reference to the timeline markings 341 in clock cycle t4. More specifically, the timeline marking corresponding to clock cycle t4 indicates that instruction group 302-1 includes the 3 instructions 330-1, 330-2, and 330-3 that had been executed by first core (C0) 174-1, but not yet committed to a previous instruction group. Other embodiments may define instruction groups 302 differently. Moreover, although instruction groups 302 have been described as being defined by the timeline markings 341, timeline markings 341 are representations of retired instruction data that the processor generates and maintains.

In at least one embodiment, interleaving 400 associates the two instruction groups associated with WaR banner 301. The ordering of instruction groups 302 within interleaving 400 is unambiguous because there is a 1:1 correspondence between the architected instructions 330 and atomic ops. In at least one embodiment, a thread interleaving depicted in FIG. 4 is reproduced by a software tool in order to recreate the execution observed originally in FIG. 3. Because there is a 1:1 correspondence between software and actual execution, coherence events are synchronized with instructions. The correspondence between software and instruction and hardware execution is encompassed by the term atomicity. In at least one embodiment, an instruction is said to have atomicity if the corresponding execution of the instruction requires only one atomic op. A complex software instruction refers to an instruction that executes as two or more atomic operations. In at least one embodiment, complex instructions violate the presumption of instruction level atomicity.

Figure 5:
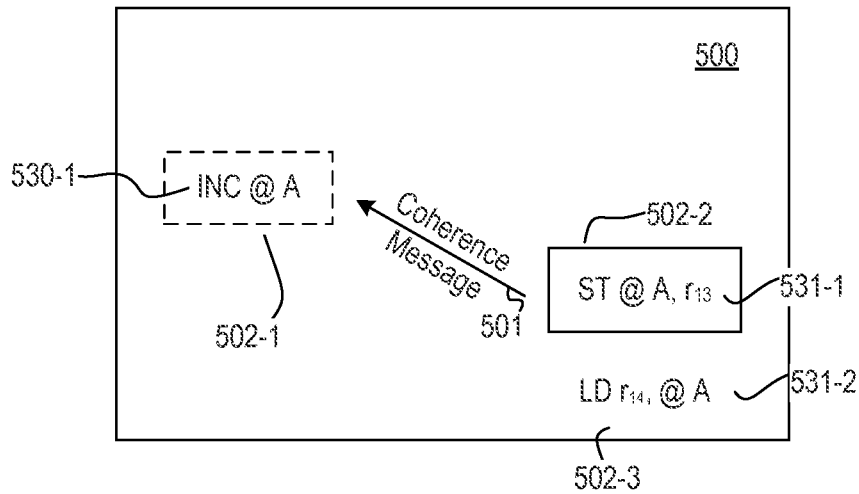
FIG. 5 illustrates a multi-operation instruction according to one embodiment.

In some embodiments, execution trace 500 includes instruction 530-1 executed in first thread (T0) 320 by first core (C0) 174-1 in clock cycle t2 and instructions 531-1 and 531-2 executed by in second thread (T1) 321 by second core (C1) 174-2. FIG. 5 illustrates coherency banner 501 recording a coherency event associated with the reference to memory address @A in instruction 531-1, creating a Write-after-Write (WaW) coherency event with respect to the earlier modification of memory address @A by first core (C0) 174-1 during execution of instruction 530-1. As described with respect to FIGS. 3 and 4, coherence banner 501 defines an interleaving of two instruction groups, each of which contains a single instruction. Execution trace 500 further illustrates instruction 531-2 also making reference to address @A. In some embodiments, instruction 531-2 may be included in the interleaving of the two instruction groups 502-2 and may, in at least one of those embodiments, be treated as a third instruction group. In other embodiments, instruction 532-2 may be incorporated into a subsequently formed instruction group.

Figure 6:
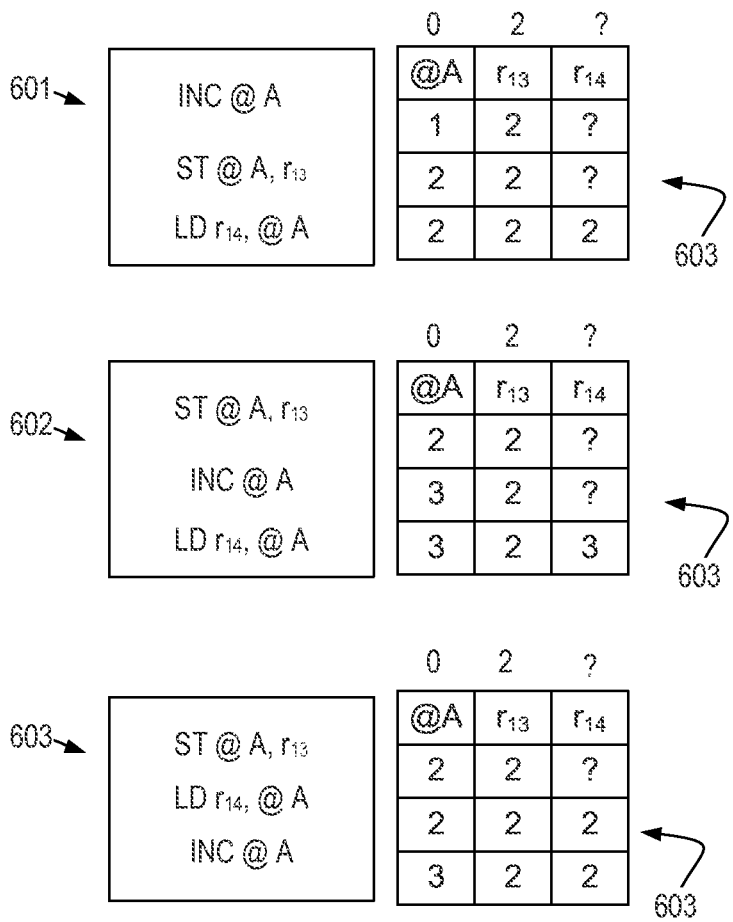
FIG. 6 illustrates an interleaving of a multi-operation instruction from a software perspective according to one embodiment.

Referring now to FIG. 6, three possible interleaving of instruction groups 502-1, 502-2, and 502-3 are illustrated. In some embodiments, interleaving 600-1 orders the three instruction groups as 502-1, 502-2, and 502-3. In some embodiments, interleaving 600-2 orders the three instruction groups as 502-2, 502-1, and 502-3. Finally, in some embodiments, interleaving 600-3 orders the three instructions groups as 502-2, 502-3, and 502-1. FIG. 6 also illustrates the resulting values of the memory and register operands involved in the three instructions, assuming an initial value of: 0 for memory address @A and 2 for register % 13. In some embodiments, the ordering of the instruction groups influences the final state or outcome 603.

Figure 7:
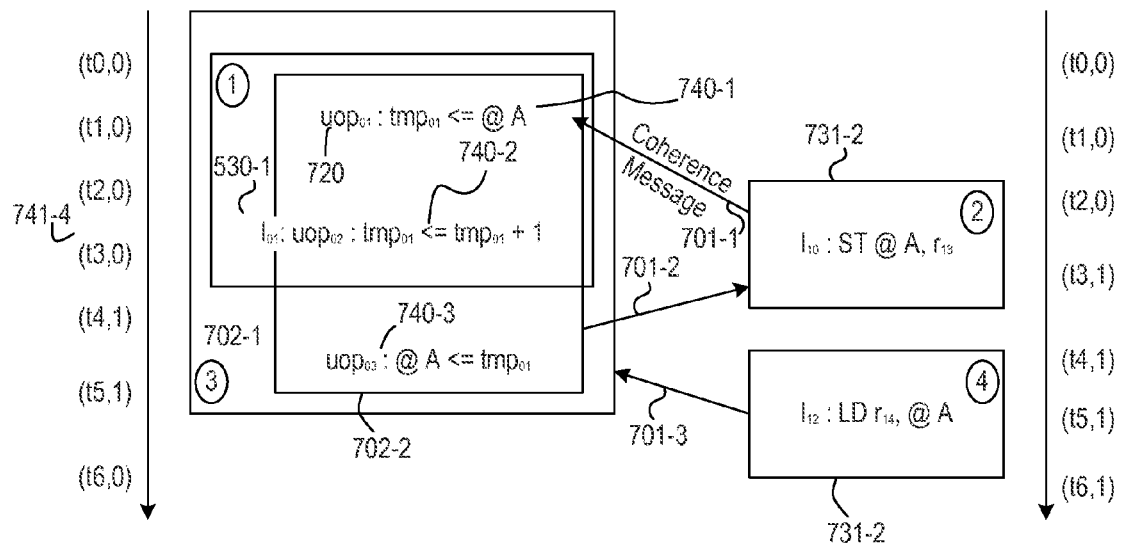
FIG. 7 illustrates a hardware view of the instruction execution used in conjunction with at least one embodiment.

Referring now to FIG. 7, a second representation of the FIG. 5 execution trace 500 is illustrated in FIG. 7 as execution trace 700. Execution trace 700 may be referred to as a hardware trace because it exposes the lack of instruction level atomicity associated with instruction 530-1.

In some embodiments, instruction 530-1 (FIG. 5), is an increment memory instruction that increments the value in a memory location identified in the instruction. In at least one embodiment, INC @A, is executed in hardware the following sequence of micro operations (atomic ops):

| | | |
|---|---|---|
| atomic op$_{01}$: | LD r$_{temp}$, @ A | [t0] |
| atomic op$_{02}$: | INC r$_{temp}$ | [t2] |
| atomic op$_{03}$: | ST @ A, r$_{temp}$ | [t4] |

Other embodiments may execute a memory-increment instruction using more, fewer, or different atomic ops and the atomic ops may have different latencies than those described.

When viewed from the hardware or atomic op perspective of FIG. 7, it is apparent that instruction 731-1 occurs, in some embodiments, at an intermediate clock cycle relative to execution of the three atomic ops 730. At t3, instruction $I_{10}$ 731-1 generates a WaR banner 701-1 with respect to memory address @A. Note however that at the clock cycle in which WaR banner 701-1 originates (t3), the number of executed architected instructions, also referred to as macro instructions is 0, indicated by timeline marking (t3,0) 741-4. Accordingly, $I_{01}$ is ordered ahead of $I_{10}$ 731-1, but only partial information relative to the execution of $I_{01}$ 530-1 is available at t3, when coherency banner 701-1 originates.

In at least some embodiments, when the INC instruction finally completes at t4, a WaW banner 701-2 is generated with the execution of atomic op$_3$ $I_{10}$ 730-3. The hardware, in some embodiments, therefore orders $I_{10}$ 731-1 before $I_{01}$ 530-1 in coherence banner 701-2. Note that this ordering of $I_{01}$ and $I_{10}$ is the opposite of the ordering associated with coherency banner 701-1. Finally, in some embodiments, when $I_{12}$ 731-2 executes in second thread (T1) 321 at t5, a RaW banner 701-3 is generated between $I_{12}$ 731-2 and $I_{01}$ 531-1. The hardware, therefore in some embodiments, orders $I_{01}$ 530-1 before $I_{12}$ 731-1 via coherence banner 701-3.

Figure 8:
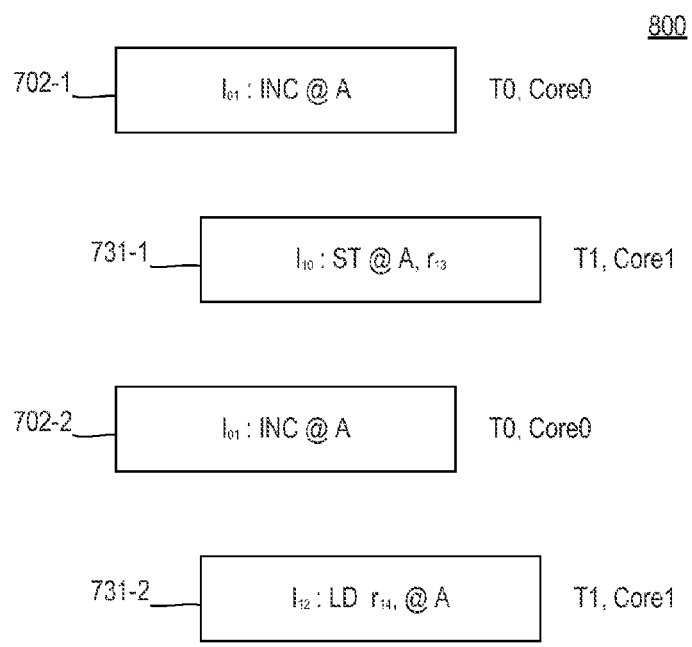
FIG. 8 illustrates a resulting instructions ordering as recorded by hardware according to one embodiment.

Referring now to FIG. 8, a hardware-perspective interleaving 800 useful in conjunction with at least one embodiment is illustrated. In at least one embodiment, interleaving 800 includes two instances of instruction groups 702 that refer to $I_{01}$. In at least one embodiment, instruction group 702-1 encompasses the atomic ops 730-1 and 730-2 that completed before $I_{10}$ completed, as suggested by the division of 702-1. In some embodiments, instruction group 702-2, which also references instruction $I_{01}$, encompasses all three atomic ops 730.

Because atomic operation execution is transparent to software in at least one embodiment, additional information must be provided to a trace generation tool that has access only to architected instruction execution registers, performance monitors, and other resources if the tool is to reproduce the ordering illustrated in FIG. 8. In at least one embodiment, additional information related to the execution of $I_{01}$ 530-1. In some embodiments, software emulation of atomic ops is used to provide the information required to interleaving 800 or an equivalent interleaving.

Figure 9:
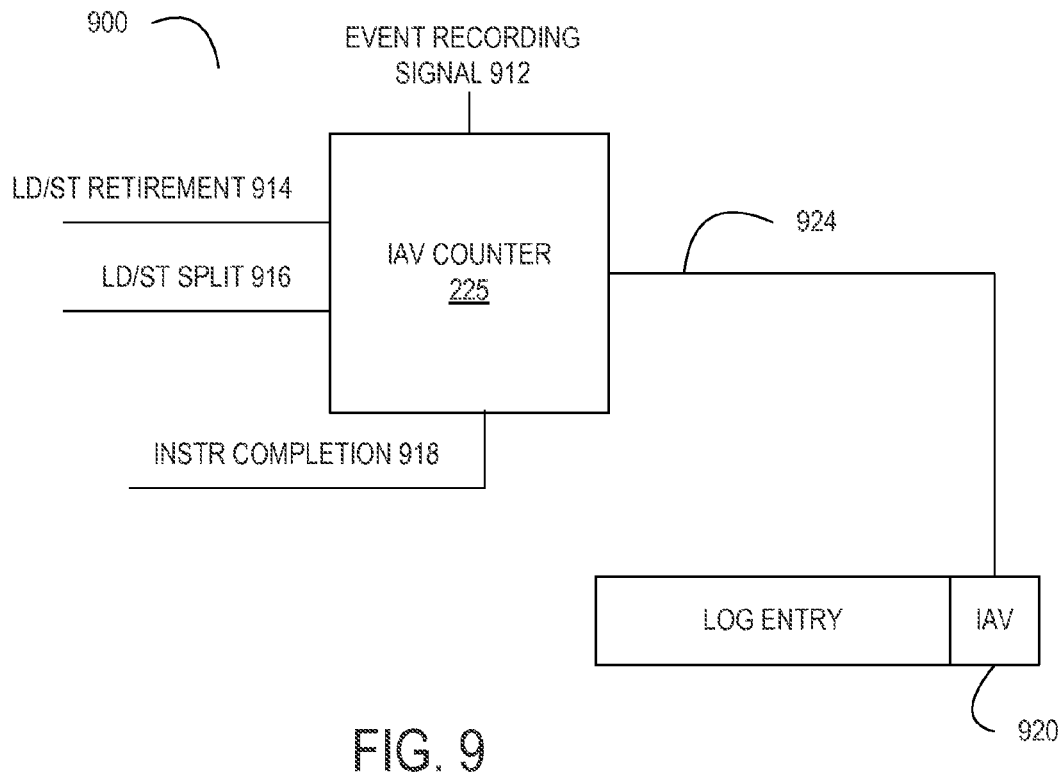
FIG. 9 illustrates an atomicity counter according to one embodiment.

Referring now to FIG. 9, an IAV counter employed in at least one embodiment is illustrated. In some embodiments, IAV counter 225 includes a hardware counter to track the progress of a complex instruction. In some embodiments, IAV counter 225 further distinguishes between multi-operation instructions that require more than one memory operation to complete and those that touch multiple cache lines. Embodiments of IAV counter 225 may rely on a load/store retirement signal 914 associated with an atomic op each time a memory operation of atomic op retires. In some embodiments, load/store split signal 916 is used by IAV counter 225 when an instruction accesses multiple cache lines.

The second case corresponds to split memory load/store operations where an instruction accesses multiple cache lines. In some embodiments, this case may occur if the address of a load/store operation crosses a cache line or bank boundary. In this case, when a split cycle is detected, the IAV counter, in some embodiments, keeps track of the progress of the split load/store operation by incrementing the counter by one each time a load/store operation of a split load/store retires.

In at least one embodiment, if an event, including but not limited to a conflict due to a cache coherence event, causes the generation of a coherency banner, during the pendency of the multi-operation instruction, i.e., before the multi operation instruction completes, event recording signal is asserted, causing IAV counter 225 to log the value of the IAV counter into a log entry and then subsequently clearing the counter. The IAV information recorded with the assertion of event recording signal 912 allows software to infer partial information about instruction completion 918 without having to resort to complex atomic op emulation. In some embodiments, the value of the IAV counter 225 is cleared when execution of the atomic op completes after the value of the counter is stored into a log entry 920 using signal 924.

Figure 10:
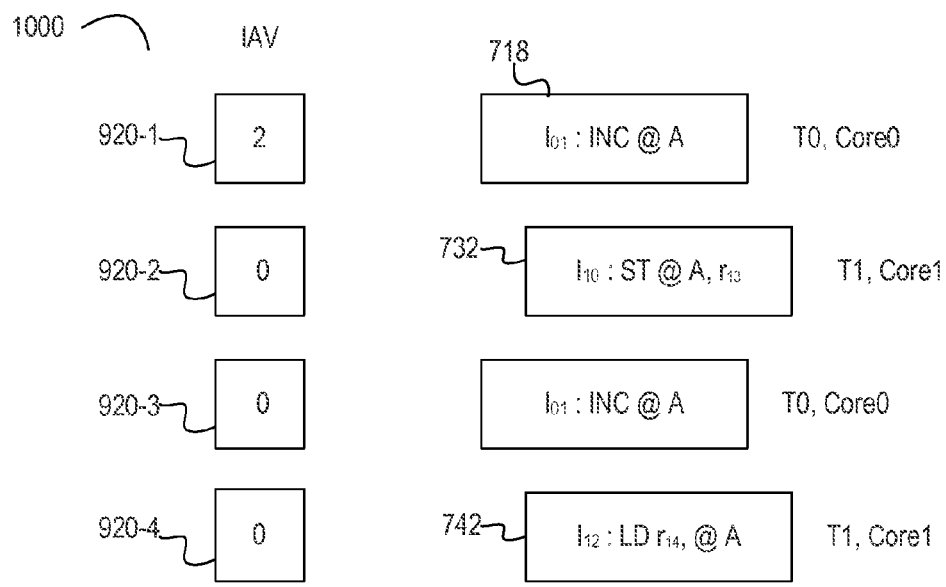
FIG. 10 illustrates a resulting instruction ordering augmented with an atomicity value according to one embodiment.

Referring now to FIG. 10, a resulting instruction ordering augmented with an IAV value according to one embodiment is illustrated. Embodiment 1000 depicts the ordering of resulting instructions 718, 732 and 742 as previously shown in FIG. 8, but with the additional IAV field entries 920-1, 920-2, 920-3 and 920-4.

In at least one embodiment, the value in the IAV field in log entry 920 is used by software to infer where exactly in the multi-operation instruction an IAV has occurred. In some embodiments, if a dependency is recorded in the middle of a multi-operation instruction, IAV is an even number and its value indicates how many single memory operations have completed their execution when the dependency was recorded. In some embodiments, if the dependency is recorded in the middle of a split memory operation, IAV is an odd number and its value indicates how many memory operations (single and split) have completed their execution when the dependency was recorded.

Figure 11:
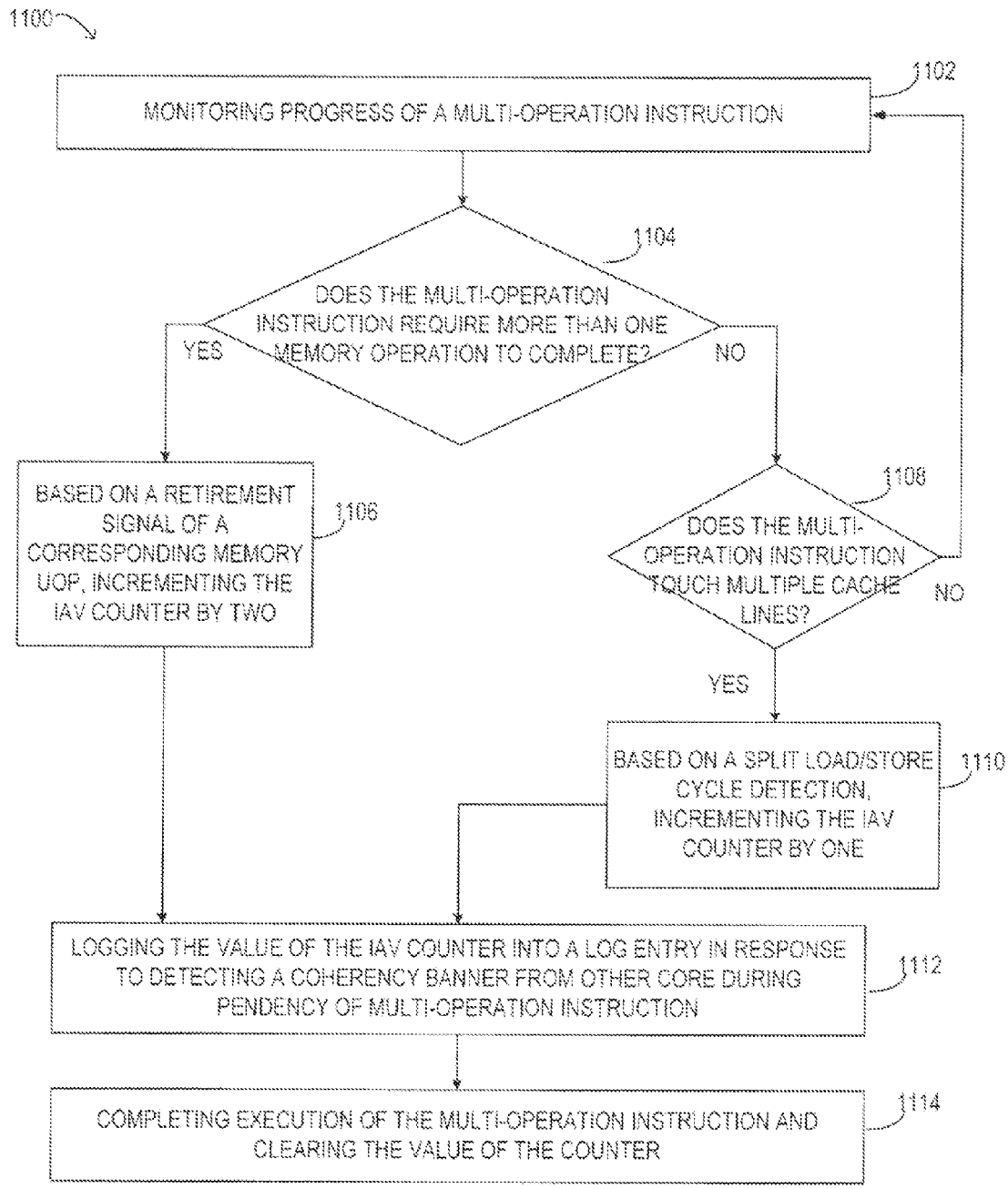
FIG. 11 illustrates one embodiment of a method to record the interleavings of shared memory accesses in the presence of complex multi-operation instructions.

Referring now to FIG. 11, one embodiment of a method to record the interleavings of shared memory accesses in the presence of complex multi-operation instructions is illustrated. In at least one embodiment, method 1100 begins with monitoring progress of an atomic op (operation 1102). Next, in decision block 1104, a determination is made, in some embodiments, if the atomic op requires more than one memory operation in order to complete. In at least one embodiment, if a determination is made that the atomic op does require more than one memory operation in order to complete, then the IAV counter is incremented by two based on a retirement signal of a corresponding memory atomic op (operation 1106). Next, in some embodiments, the value of the IAV counter is logged into a log entry (operation 1112) in response to a coherency message or banner generated by another processing core during the pendency of the multi-operation instruction. If the multi-operation instruction completes before any coherency conflict event occurs, the IAV will be cleared. In either scenario, execution of the atomic op will complete, and the value of the counter is cleared (operation 1114).

In at least one embodiment, if a determination is made in decision block 1104 that the atomic op does not require more than one memory operation in order to complete, then a determination is made if the atomic op touches multiple cache lines (operation 1108). In some embodiments, if it is determined that the atomic op does not touch multiple cache lines, the flow returns to operation 1102 to continue monitoring the progress of atomic ops. In some embodiments, if it is determined that the atomic op does touch multiple cache lines, then based on a split load/store cycle detection the IAV counter is incremented by one (operation 1110). In at least one embodiment, the value of the counter is copied into a log entry (operation 1112) and execution of the atomic op is completed and the value of the counter is cleared (operation 1114).

Figure 12:
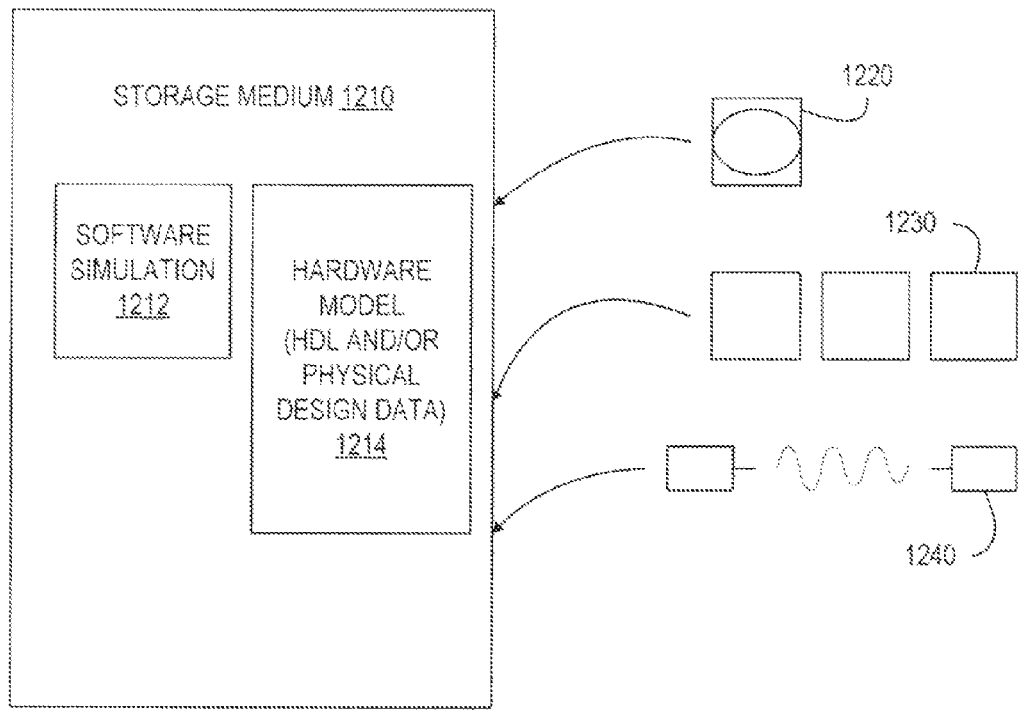
FIG. 12 illustrates a representation for simulation, emulation and fabrication of a design implementing the disclosed techniques.

Referring now to FIG. 12, a representation for simulation, emulation and fabrication of a design implementing the disclosed techniques is illustrated. Data representing a design may represent the design in a number of manners. First, as is useful in simulations, the hardware may be represented using a hardware description language or another functional description language which basically provides a computerized model of how the designed hardware is expected to perform. In at least one embodiment, the hardware model 1214 may be stored in a storage medium 1210 such as a computer memory so that the model may be simulated using simulation software 1212 that applies a particular test suite to the hardware model 1214 to determine if it indeed functions as intended. In some embodiments, the simulation software 1212 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In some embodiments, an optical or electrical wave 1240 modulated or otherwise generated to transmit such information, a memory 1230, or a magnetic or optical storage 1220 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following pertain to further embodiments:

Embodiment 1 is an instruction tracing method comprising: incrementing a counter value by a first predetermined constant responsive to detecting a first type of atomic operation (atomic op) event; incrementing the counter value by a second predetermined constant responsive to detecting completion of a second type of atomic op event; resetting the counter value responsive to a complex instruction completing; and recording a value of an atomicity counter in conjunction with a record of the complex instruction responsive to a coherency event associated with a memory access by a first thread occurring during a pendency of the complex instruction.

In embodiment 2, the first type of atomic op event included in the subject matter of embodiment 1 is optionally a memory access atomic op.

In embodiment 3, the first type of atomic op event included in the subject matter of embodiment 2 can optionally include a retirement of an atomic op memory access.

In embodiment 4, the first predetermined constant included in the subject matter of embodiment 2 is optionally indicative of a latency of a memory access.

In embodiment 5, the first predetermined constant included in the subject matter of embodiment 4 can optionally represents to two core clock cycles.

In embodiment 6, the second type of atomic op event included in the subject matter of embodiment 1 is optionally a split load/store comprising a load that spans a cache line boundary and requires a plurality of accesses.

In embodiment 7, the second type of atomic op event included in the subject matter of embodiment 1 can optionally include a retirement of an atomic op memory access.

In embodiment 8, the subject matter of embodiment 1 can optionally include determining an interleaving for an execution trace that includes a complex instruction executed on a second thread, and a simple instruction on the second thread, wherein the interleaving includes a first instruction group and a second instruction group corresponding to the complex instruction.

In embodiment 9, the first instruction group included in the subject matter of embodiment 8 can optionally include atomic operations that complete before the execution of the simple instruction on the second thread and the second instruction group included in the subject matter of embodiment 1 can optionally include atomic operations that complete after execution of the simple instruction on the second thread.

In embodiment 10, the subject matter of embodiment 9 can optionally include non-zero values of the atomicity counter associated with the first instruction group.

Embodiment 11 is a processor comprising: a first core to execute a first thread including a complex instruction, wherein the complex instruction executes as a plurality of atomic operations (atomic ops); a second core to execute a second thread including a simple instruction; and an atomicity counter to: increment a counter value by a first predetermined constant responsive to detecting a first type of atomic op event; increment the counter value by a second predetermined constant responsive to detecting completion of a second type of atomic op event; reset the counter value responsive to the complex instruction completing; and record a value of the atomicity counter in conjunction with a record of the complex instruction responsive to a coherency event associated with a memory access by the second thread occurring during a pendency of the complex instruction.

In embodiment 12, the first type of atomic op event included in the subject matter of embodiment 11 is optionally a memory access atomic op.

In embodiment 13, the first type of atomic op event included in the subject matter of embodiment 12 can optionally include a retirement of an atomic op memory access.

In embodiment 14, the first predetermined constant included in the subject matter of embodiment 12 is optionally indicative of a latency of a memory access.

In embodiment 15, the first predetermined constant included in the subject matter of embodiment 14 can optionally represents to two core clock cycles.

In embodiment 16, the second type of atomic op event included in the subject matter of embodiment 11 is optionally a split load/store comprising a load that spans a cache line boundary and requires a plurality of accesses.

In embodiment 17, the second type of atomic op event included in the subject matter of embodiment 11 can optionally include a retirement of an atomic op memory access.

Embodiment 18 is a computer system comprising: comprising: a first core to execute a first thread including a complex instruction, wherein the complex instruction executes as a plurality of atomic operations (atomic ops); a second core to execute a second thread including a simple instruction; and an atomicity counter to: increment a counter value by a first predetermined constant responsive to detecting a first type of atomic op event; increment the counter value by a second predetermined constant responsive to detecting completion of a second type of atomic op event; reset the counter value responsive to the complex instruction completing; and record a value of the atomicity counter in conjunction with a record of the complex instruction responsive to a coherency event associated with a memory access by the second thread occurring during a pendency of the complex instruction.

In embodiment 19, the first type of atomic op event included in the subject matter of embodiment 18 is optionally a memory access atomic op.

In embodiment 20, the first type of atomic op event included in the subject matter of embodiment 19 can optionally include a retirement of an atomic op memory access.

In embodiment 21, the first predetermined constant included in the subject matter of embodiment 19 is optionally indicative of a latency of a memory access.

In embodiment 22, the first predetermined constant included in the subject matter of embodiment 21 can optionally represents to two core clock cycles.

In embodiment 23, the second type of atomic op event included in the subject matter of embodiment 18 is optionally a split load/store comprising a load that spans a cache line boundary and requires a plurality of accesses.

In embodiment 24, the second type of atomic op event included in the subject matter of embodiment 18 can optionally include a retirement of an atomic op memory access.

In embodiment 25, the subject matter of any one of embodiments 1-7 can further include determining an interleaving for an execution trace that includes a complex instruction executed on a second thread, and a simple instruction on the first thread, wherein the interleaving includes a first instruction group and a second instruction group corresponding to the complex instruction.

In embodiment 26, the second type of atomic op event included in the subject matter of any one of embodiments 11-15 is optionally a split load/store comprising a load that spans a cache line boundary and requires a plurality of accesses.

In embodiment 27, the second type of atomic op event included in the subject matter of any one of embodiments 18-22 is optionally a split load/store comprising a load that spans a cache line boundary and requires a plurality of accesses.

In embodiment 28, the second type of atomic op event included in the subject matter of any one of embodiments 18-23 can optionally include a retirement of an atomic op memory access.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method, comprising:
   monitoring progress of a complex instruction comprising a multi-operation instruction;
   detecting that a plurality of memory operations are to complete for a first type of atomic operation (atomic op) event of the complex instruction comprising the multi-operation instruction;
   in response to a retirement signal of a corresponding memory operation of the complex instruction, incrementing a counter value of an instruction atomicity violation counter of a processor by a first constant;
   detecting that a second type of atomic op event of the complex instruction accesses a plurality of cache lines;
   in response to a split signal when the second type of atomic operation occurs, incrementing the counter value by a second constant different than the first constant;
   resetting the counter value responsive to the complex instruction completing; and
   in response to an event recording signal, recording the counter value in a log entry in conjunction with a trace of the complex instruction responsive to a coherency message associated with a memory access by a first thread having a dependency occurring during a pendency of the complex instruction, the counter value indicative of where in the complex instruction that an instruction atomicity violation has occurred, wherein the recorded counter value of the instruction atomicity violation counter when of a first set of values is to indicate a number of single memory operations of the complex instruction that have completed execution when the dependency was recorded and the recorded counter value when of a second set of values is to indicate a number of single and split memory operations of the complex instruction that have completed execution when the dependency was recorded, the first set of values and the second set of values non-overlapping.

2. The method of claim 1, wherein the first type of atomic op event is a memory access atomic op.

3. The method of claim 2, wherein the first type of atomic op event comprises a retirement of an atomic op memory access.

4. The method of claim 2, wherein the first constant is indicative of a latency of a memory access.

5. The method of claim 4, wherein the first constant represents two core clock cycles.

6. The method of claim 1, wherein the second type of atomic op event is a split load/store comprising a load that spans a cache line boundary and uses a plurality of accesses to access the plurality of cache lines.

7. The method of claim 1, wherein the second type of atomic op event comprises a retirement of an atomic op memory access.

8. The method of claim 1, further comprising:
   determining an interleaving for an execution trace that includes the complex instruction executed on a second thread, and a simple instruction on the first thread, wherein the interleaving includes a first instruction group and a second instruction group corresponding to the complex instruction.

9. The method of claim 8, wherein:
   the first instruction group includes atomic operations that complete before the execution of the simple instruction on the second thread; and
   the second instruction group includes atomic operations that complete after execution of the simple instruction on the second thread.

10. The method of claim 9, further comprising: non-zero values of the atomicity counter associated with the first instruction group.

11. A processor, comprising:
   a first core to execute a first thread including a complex instruction, wherein the complex instruction is to execute as a plurality of atomic operations (atomic ops);
   a second core to execute a second thread including a simple instruction; and
   an instruction atomicity violation counter to:
      increment the instruction atomicity violation counter by a first constant responsive to detection that a plurality of memory operations are to complete for a first type of atomic op event of the complex instruction comprising a multi-operation instruction and a retirement signal to indicate that a corresponding memory operation of the plurality of memory operations has retired;
      increment the instruction atomicity violation counter by a second constant different than the first constant responsive to detection that a second type of atomic op event of the complex instruction is to access a plurality of cache lines and a split signal to indicate that the second type of atomic op event of the complex instruction has accessed the plurality of cache lines;
reset the counter value responsive to the complex instruction completion; and
in response to assertion of an event recording signal, record a value of the instruction atomicity violation counter in conjunction with a record of the complex instruction responsive to a coherency message associated with a memory access by the second thread having a dependency occurring during a pendency of the complex instruction, wherein the recorded counter value when of a first set of values is to indicate a number of single memory operations of the complex instruction that have completed execution when the dependency was recorded and the recorded counter value when of a second set of values is to indicate a number of single and split memory operations of the complex instruction that have completed execution when the dependency was recorded, the first set of values and the second set of values non-overlapping.

12. The processor of claim 11, wherein the first type of atomic op event is a memory access atomic op.

13. The processor of claim 11, wherein the first type of atomic op event comprises a retirement of an atomic op memory access.

14. The processor of claim 12, wherein the first constant is indicative of a latency of a memory access.

15. The processor of claim 14, wherein the first constant represents two core clock cycles.

16. The processor of claim 11, wherein the second type of atomic op event is a split load/store comprising a load that spans a cache line boundary and requires a plurality of accesses.

17. The processor of claim 11, wherein the second type of atomic op event comprises a retirement of an atomic op memory access.

18. A computer system, comprising:
a processor, comprising:
a first core to execute a first thread including a complex instruction, wherein the complex instruction is to execute as a plurality of atomic operations (atomic ops);
a second core to execute a second thread including a simple instruction; and
an instruction atomicity violation counter to:
increment the instruction atomicity violation counter by a first constant responsive to detection that a plurality of memory operations are to complete for a first type of atomic op event of the complex instruction comprising a multi-operation instruction and a retirement signal to indicate that a corresponding memory operation of the plurality of memory operations has retired;
increment the instruction atomicity violation counter by a second constant different than the first constant responsive to detection that a second type of atomic op event of the complex instruction is to access a plurality of cache lines and a split signal to indicate that the second type of atomic op event of the complex instruction has accessed the plurality of cache lines;
reset the counter value responsive to the complex instruction completion; and
in response to assertion of an event recording signal, record a value of the instruction atomicity violation counter in conjunction with a record of the complex instruction responsive to a coherency message associated with a memory access by the second thread having a dependency occurring during a pendency of the complex instruction, wherein the recorded counter value when of a first set of values is to indicate a number of single memory operations of the complex instruction that have completed execution when the dependency was recorded and the recorded counter value when of a second set of values is to indicate a number of single and split memory operations of the complex instruction that have completed execution when the dependency was recorded, the first set of values and the second set of values non-overlapping; and
system memory accessible to the processor.

19. The system of claim 18, wherein the first type of atomic op event is a memory access atomic op.

20. The system of claim 18, wherein the first type of atomic op event comprises a retirement of an atomic op memory access.

21. The system of claim 19, wherein the first constant is indicative of a latency of a memory access.

22. The system of claim 21, wherein the first constant represents two core clock cycles.

23. The system of claim 18, wherein the second type of atomic op event is a split load/store comprising a load that spans a cache line boundary and requires a plurality of accesses.

24. The system of claim 18, wherein the second type of atomic op event comprises a retirement of an atomic op memory access.

* * * * *